United States Patent Office 3,299,999
Patented Jan. 24, 1967

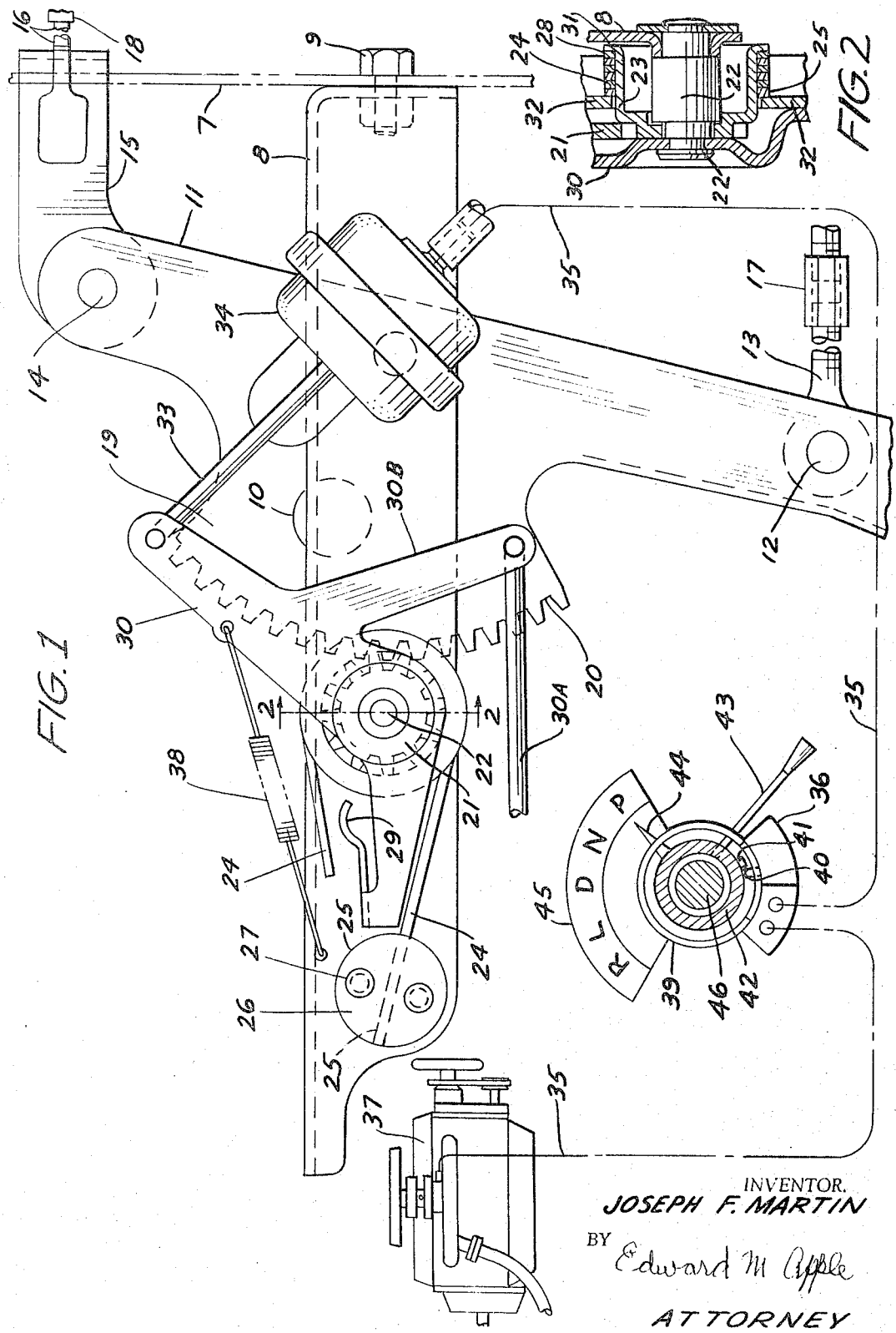

3,299,999
SINGLE LEVER SERVICE AND EMERGENCY
BRAKE SYSTEM
Joseph F. Martin, Detroit, Mich., assignor to Joseph F. Martin and Mabel M. Martin, as tenants by the entireties, with rights of survivorship
Filed July 19, 1965, Ser. No. 472,866
6 Claims. (Cl. 192—4)

This invention relates to braking systems for motor vehicles, and has particular reference to a single lever service brake and emergency brake.

This invention is an improvement on the device disclosed in United States Patent No. 3,003,605, issued to Apple on October 10, 1961, in which is disclosed a single lever power actuated service and emergency brake system.

In the patent to Apple, a power actuated hydraulic service brake system is employed with a bypass in the hydraulic system, which actuates a hydraulic cylinder for normally holding the emergency brake out of operating condition, and during the normal use of the hydraulic brakes. In the disclosure of that patent, the emergency brake is actuated only upon failure of the hydraulic system. In that patent disclosure the emergency brake only locks the two rear wheels, or the drive shaft, if the emergency brake is positioned on the drive shaft, as is the case with certain automobiles.

In the instant application, I propose to eliminate the use of the bypass in the hydraulic system, and work both the service brakes and the emergency brakes through mechanical linkage with a single brake lever.

In this application, I use a vacuum system with parts associated with the vacuum system for holding the foot lever in locked position, so that the service brakes on all four wheels of the vehicle are utilized as parking brakes, in addition to the conventional emergency brake, which also serves as a parking brake with my device.

Although I have herein disclosed the use of the vacuum system of the vehicle for effecting the locking function for the common brake lever, it is also within the contemplation of the invention to use a solenoid in connection with the electrical system of the vehicle, or other means for effecting the locking of the common brake lever in parking position.

It is an object of the invention to provide power means for locking the service brakes, as well as the emergency brake in park position, so that the vehicle may not be moved.

Although I have illustrated the use of my device with a vehicle having an automatic transmission and range selector mechanism on the steering column, it will be understood that my device may also be employed with a conventional "stick" shift transmission, in which application the gearshift lever would be provided with a vacuum control valve actuator, or a contact button for closing and opening the circuit to the solenoid, if a solenoid were used instead of the vacuum cylinders herein disclosed.

It will be understood that in the instant application the common brake lever will be locked in position as long as the range selector indicator is on "park," and the brake lever will be free to operate, in its normal manner as a service brake at all times when the range selector indicator is on "neutral," or in any drive position.

It will also be understood that the conventional linkage adjustments on the service brake system and the emergency brake system may be adjusted, so that in manually applying the common brake lever, the service brakes may be actuated slightly ahead of the emergency brake.

It will also be understood that in the event of the failure of the hydraulic system, or other system, controlling the service brakes, the emergency brake system will then automatically act as a service brake at all times when the vehicle is in motion.

The within device is also compatible with and will operate on those vehicles which employ a parking brake comprising a pawl which engages lugs on the reverse planet carrier, and locks the output shaft to the transmission case, in order to effect a parking brake. With such a construction, there is always the danger of having the pawl and the lugs knocked off in the event that somebody crashes into the vehicle when it is parked with such a device. With the applicant's device, however, such damage would not be possible as the parking brake is effected through the conventional service and emergency brake systems.

It is therefore, an object of the invention to provide a conventional foot actuated service brake, with means thereon for also actuating the emergency brake system whereby to effect a double action parking brake through the use of a single brake lever.

Another object of the invention is to provide a braking device of the character indicated with means for setting and releasing the service and emergency brakes, which means are responsive to the movement of the transmission range selector control, or the gearshift lever.

Another object of the invention is to provide means for operating the emergency brake, in the event of service brake failure through the loss of fluid in the hydraulic lines, or the like.

Another object of the invention is the provision of a device of the character indicated, with means for automatically releasing the emergency and service brake when the range selector indicator is in any position other than "park."

Another object of the invention is to provide a device of the character indicated which is provided with power means for holding the service and emergency brakes in locked position when the transmission range control is in "park" position, and means for unlocking the service and emergency brake when the range selector indicator is in any position other than "park."

Another object of the invention is to provide a device of the character indicated in which the emergency and service brakes can be power locked by a dual purpose brake lever, and may be released by manual means operable from the dashboard, or other suitable position.

Another object of the invention is to provide a device of the character indicated, which is provided with means for automatically rendering the emergency brake system operative as the service brake in the event of failure of the service brake system.

The foregoing and other objects and advantages of the invention will become more apparent as the description proceeds, reference being made from time to time to the accompanying drawing, forming part of the within disclosure, in which drawing:

FIG. 1 is a side elevational view of a device embodying the invention, with parts in section and parts broken away, and with other parts illustrated schematically for illustrative purposes.

FIG. 2 is a vertical section taken substantially on the line 2—2 of FIG. 1.

Referring now more particularly to the drawings, it will be understood that in the embodiment herein disclosed the reference character 7 indicates the firewall of a motor vehicle, to which is mounted a bracket 8 which supports the device embodying the invention.

The bracket 8 is mounted by means of suitable fastening elements 9. The opposite end of the bracket 8 may be attached to the dash of the vehicle (not shown).

Pivotably mounted on the bracket 8, as at 10, is a manually operated brake lever 11, at the lower end of which is the conventional foot pedal (not shown).

The brake lever 11 has pivoted to it, as at 12, a rod 13 which is arranged to actuate the master cylinder (not shown) of a conventional hydraulic brake system. At the upper end of the brake lever 11 is pivotably mounted, as at 14, a fitting 15, to which is secured one end of an emergency brake cable 16.

It will be understood that the length of the rod 13 may be adjusted as at 17, and the length of the cable 16 may be adjusted as at 18, so that the application of the hydraulic brakes may be effected slightly ahead of the application of the emergency brake of the vehicle.

This device will function with any conventional emergency brake system, whether it be on the rear wheels of the vehicle, or on the driveshaft thereof.

The device hereinclosed is also compatible with and will function with vehicles equipped with a parking brake employing a pawl, which engages lugs on the reverse planet carrier of the transmission, to lock the output shaft against rotation.

The lever 11 is provided with an arcuate extension 19, which is provided with a rack 20, which rack 20 is arranged to receive the teeth of a pinion 21, which is pivoted as at 22 to the bracket 8 (FIG. 2).

Also pivoted as at 22 (FIG. 2) is a brake member 23, to which the pinion 21 is secured.

The brake member 23 is encircled by a wound spring 24, one end of which is anchored as at 25 by means of a member 26, which is secured to the bracket 8 as at 27, by any suitable means.

The opposite end 28 of the spring 24 is free and is arranged to be contacted by an arm 29, which consists of a return portion formed on the comparatively smaller lever 30, which is also pivoted as at 22.

The purpose of the lever 30 (FIGS. 1 and 2) is to actuate the spring brake 23–24, so that the pinion 21 may be locked against rotation, or may be freed for rotation.

When the member 29 is out of contact with the end 28 of the spring 24, the spring 24 is tightly wound around the brake member 23, and the pinion 21 is locked against rotation. When the member 29 is brought into contact with the end 28 of the spring 24, the spring 24 is expanded and the brake member 23 and the pinion 21 are then free to rotate.

The spring 24 is retained against lateral movement on the brake member 23 by means of an integrated flange 31, and a washer 32.

The lever 30 may be rocked on the pivot 22 to the right of the position shown in FIG. 1 by means of the rod 33, which is connected to the piston of a conventional vacuum member 34, which communicates through the vacuum line 35, and the valve 36, with the vacuum side of the vehicle engine 37, which is diagrammatically illustrated in FIG. 1.

The lever 30 is moved in the opposite direction by means of a spring 38. The tension on the spring 38 may be overcome by the pull of the vacuum on the rod 33, so that when the vehicle engine 37 is running and the valve 36 is open there is always enough vacuum in the line 35 to hold the lever 30 in a position to the right of that shown in FIG. 1. When the vacuum is on and the lever 30 is moved to the right the member 29 will contact the underside of the end 28 of the spring 24, causing the spring 24 to be loosened on the brake 23, so that the brake 23 and the pinion 21 are free to rotate, and the rack 20, and the brake lever 11 are free to pivot on the pivot 10.

When the vacuum is off, either by stopping the engine or by closing the valve 36, the spring 38 is then free to move the lever 30 to the position shown in FIG. 1, in which position the member 29 is out of contact with the underside of the spring 24, and the spring 24 is in frictional engagement with the brake member 23, to lock the pinion 21 against rotation. This in turn locks the rack 20 and the lever 11 against movement.

The lever 30 may be rocked to the right also by means of the pull rod 30A which actuates the lever extension 30B, which forms a part of the lever 30. The pull rod 30A terminates in a member operable by hand or foot located somewhere near the dash (not shown). This serves the same purpose as the vacuum power to actuate the lever 30.

The vacuum valve 36 is mounted on the steering column 39, and is opened and closed by means of an element 40, which is actuated by an element 41, carried on the shifting tube 42, to which is also secured the shift lever 43 and the range selector indicator 44, which indicates the different shift positions on the range selector dial 45. The element 41 may also be positioned to be actuated by a push button of a push button selector system.

The reference character 46 indicates the steering shaft.

When the range selector arm is in the position shown in FIG. 1, and the indicator 44 is at "park" position, the vacuum valve 36 will be closed and there will be no vacuum power to actuate the lever 30, so that the spring 38 is free to rock the lever 30 to the left position shown in FIG. 1, and to hold the arm 29 away from the spring 24 and to hold the brake in engagement, in which condition the pinion 21 and the rack 20 are locked against rotation. In this position the hydraulic brakes are set on all four wheels, and the emergency brake is set either on the two rear wheels, or on the emergency brake on the drive shaft, so that in "park" position the vehicle will have the double emergency braking power of the hydraulic brakes as well as the conventional mechanical emergency brake.

It will be understood that adjustments may be made on the hydraulic brake system and on the mechanical emergency brake linkage, so that during normal drive operations the hydraulic brakes may be used without affecting the emergency brake, and by the same token, should the hydraulic system fail during driving operations, the lever 11 will be free of any resistance in the hydraulic system, and the upper end of the lever 11 will be free to travel whatever distance is necessary to operate the emergency brake.

It will, therefore, be seen that I have provided a single lever, manually operated braking system which normally provides a compound braking action when the vehicle is parked, and provides a normal hydraulic service braking action during all driving operations, and provides an automatic emergency brake action in the event of failure of the hydraulic service brake system.

It is believed that the operation of the device is obvious from the foregoing description.

Having described by invention, what I claim and desire to secure by Letters Patent is:

1. In a motor vehicle having a service brake mechanism, an emergency brake mechanism and a transmission range selector mechanism, the combination of a common brake lever pivoted near its center and having means near its lower end for actuating the said service brake mechanism, means at its upper end for actuating said emergency brake mechanism and means associated therewith for simultaneously locking both said brake mechanisms against movement when said range selector mechanism is set at a non-driving position, and for unlocking both said brake mechanism when said range selector mechanism is set at any driving position.

2. The structure of claim 1, in which said last named means include a constantly meshed rack and pinion, said rack comprising part of said brake lever and said pinion being pivoted to a pivot which in turn is pivoted to a support bracket, a smaller lever pivoted to said first pivot and rockable in one direction by a spring and rockable in the other direction by power means responsive to the positioning of said range selector mechanism, and brake means responsive to the rocking of said smaller lever for locking and unlocking said pinion against rotation.

3. The structure of claim 1, in which said last named means include a constantly meshed rack and pinion, said rack comprising part of said brake lever and said pinion being pivoted to a pivot which in turn is pivoted to a support bracket, a smaller lever pivoted to said first pivot and rockable in one direction by a spring and rockable in the other direction by power means responsive to the positioning of said range selector mechanism, and brake means responsive to the rocking of said smaller lever for locking and unlocking said pinion against rotation and manual means for releasing said last named brake means.

4. The structure of claim 1, including push pull elements on said service brake mechanism and said emergency brake mechanism and adjustable means on said push pull elements for lengthening and shortening said push pull elements whereby said service brake mechanism may be actuated ahead of said emergency brake mechanism by said brake lever when said range selector mechanism is in any driving position.

5. The structure of claim 1, in which said emergency brake mechanism will be actuated as a secondary service brake by the travel of said brake lever should there be a failure of said first named service brake mechanism.

6. In a motor vehicle having a service brake mechanism, an emergency brake mechanism and a transmission range selector mechanism, the combination of a common brake lever pivoted near its center and having means near its lower end for actuating the said service brake mechanism, means at its upper end for actuating said emergency brake mechanism and means associated therewith for simultaneously locking both said brake mechanisms against movement when said range selector mechanism is set at a non-driving position, and for unlocking both said brake mechanisms when said range selector mechanism is set at any driving position, said last named means including a constantly meshed rack and pinion, said rack comprising part of said brake lever and said pinion being pivoted to a pivot which in turn is pivoted to a support bracket, a smaller lever pivoted to said first pivot and rockable in one direction by a spring and rockable in the other direction by power means responsive to the positioning of said range selector mechanism, and brake means responsive to the rocking of said smaller lever for locking and unlocking said pinion against rotation, said power means including a vacuum cylinder in communication with the motor of said vehicle, and a vacuum control valve having means associated with the said speed selector mechanism for opening and closing said valve.

References Cited by the Examiner

UNITED STATES PATENTS 3,003,605  10/1961  Apple _____ 192—4
3,270,840  9/1966  De Claire _____ 192—4

DAVID J. WILLIAMOWSKY, *Primary Examiner.*

ARTHUR T. McKEON, *Examiner.*